US009064377B2

(12) United States Patent
Johnson et al.

(10) Patent No.: US 9,064,377 B2
(45) Date of Patent: Jun. 23, 2015

(54) WAGERING GAME, GAMING MACHINE, NETWORKED GAMING SYSTEM AND METHOD WITH A BASE GAME AND A SIMULTANEOUS BONUS CURRENCY GAME

(71) Applicant: Multimedia Games, Inc., Austin, TX (US)

(72) Inventors: Bradley W. Johnson, Austin, TX (US); Brian A. Watkins, Austin, TX (US); Clint Owen, Austin, TX (US); Darren Schueller, Austin, TX (US); JP Cody, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 0 days.

(21) Appl. No.: 14/040,153

(22) Filed: Sep. 27, 2013

(65) Prior Publication Data

US 2014/0024442 A1 Jan. 23, 2014

Related U.S. Application Data

(63) Continuation-in-part of application No. 13/221,819, filed on Aug. 30, 2011, now Pat. No. 8,608,546, and a continuation-in-part of application No. 13/250,787, filed on Sep. 30, 2011, now abandoned, which is a (Continued)

(51) Int. Cl.
*G07F 17/32* (2006.01)
*A63F 13/10* (2006.01)

(52) U.S. Cl.
CPC ........ *G07F 17/3244* (2013.01); *G07F 17/3262* (2013.01)

(58) Field of Classification Search
USPC ............................................... 463/22, 23, 25
See application file for complete search history.

(56) References Cited

U.S. PATENT DOCUMENTS

| | | | |
|---|---|---|---|
| 4,582,324 | A | 4/1986 | Koza et al. |
| 6,227,974 | B1 | 5/2001 | Eilat et al. |
| 6,315,660 | B1 | 11/2001 | DeMar et al. |
| 6,508,707 | B2 | 1/2003 | DeMar et al. |
| 6,520,855 | B2 | 2/2003 | DeMar et al. |
| 6,632,138 | B1 | 10/2003 | Serizawa et al. |
| 6,666,766 | B2 | 12/2003 | Baerlocher et al. |
| 6,843,723 | B2 | 1/2005 | Joshi |

(Continued)

OTHER PUBLICATIONS

International Search Report dated Jan. 11, 2012, in PCT application No. PCT/US2011/046639 (2 pages).

(Continued)

*Primary Examiner* — Pierre E Elisca
(74) *Attorney, Agent, or Firm* — Nathan H. Calvert, Esq.; Russell D. Culbertson, Esq.; JP Cody, Esq.

(57) ABSTRACT

A system, apparatus, and method are disclosed in which a bonus currency game is operable simultaneously with the primary game. When a player initiates play of the primary game, the bonus currency game is initiated as well. The bonus currency game includes a set of target symbols which have corresponding bonus currency values such that, when a target symbol is activated, such as by a random or quasi-random determination, the bonus currency value associated with the target symbol is awarded to the player. After a player accumulates bonus currency, the player may utilize the currency to purchase various available online items, such as game plays in an arcade.

20 Claims, 5 Drawing Sheets

Related U.S. Application Data continuation-in-part of application No. 13/195,037, filed on Aug. 1, 2011, and a continuation-in-part of application No. 12/818,402, filed on Jun. 18, 2010.

(60) Provisional application No. 61/707,410, filed on Sep. 28, 2012, provisional application No. 61/413,433, filed on Nov. 13, 2010, provisional application No. 61/371,532, filed on Aug. 6, 2010, provisional application No. 61/321,406, filed on Apr. 6, 2010.

(56) References Cited

U.S. PATENT DOCUMENTS

| | | | | |
|---|---|---|---|---|
| 6,851,674 | B2 | 2/2005 | Pierce et al. | |
| 6,869,361 | B2 | 3/2005 | Sharpless et al. | |
| 6,939,226 | B1 | 9/2005 | Joshi | |
| 6,974,385 | B2 | 12/2005 | Joshi et al. | |
| 6,984,174 | B2 | 1/2006 | Cannon et al. | |
| 6,991,543 | B2 | 1/2006 | Joshi | |
| 7,090,577 | B2 | 8/2006 | Serizawa et al. | |
| 7,169,044 | B2 | 1/2007 | Baerlocher et al. | |
| 7,195,560 | B2 | 3/2007 | DeMar et al. | |
| 7,390,260 | B2 | 6/2008 | Englman | |
| 7,452,271 | B2 | 11/2008 | DeMar et al. | |
| 7,465,231 | B2 | 12/2008 | Lewin et al. | |
| 7,593,740 | B2 | 9/2009 | Crowley et al. | |
| 7,662,040 | B2 | 2/2010 | Englman et al. | |
| 7,690,998 | B2 | 4/2010 | Okada | |
| 7,753,777 | B1 | 7/2010 | Giuffria et al. | |
| 7,780,511 | B2 | 8/2010 | Casey et al. | |
| 7,780,531 | B2 | 8/2010 | Englman et al. | |
| 7,862,419 | B2 | 1/2011 | Baerlocher et al. | |
| 7,922,579 | B2 | 4/2011 | Walker et al. | |
| 7,934,989 | B2 | 5/2011 | Joshi et al. | |
| 8,070,587 | B2 * | 12/2011 | Davis et al. | 463/20 |
| 8,113,947 | B2 | 2/2012 | Hornik et al. | |
| 8,152,632 | B2 | 4/2012 | Fong | |
| 8,187,089 | B2 | 5/2012 | Englman et al. | |
| 8,267,797 | B2 | 9/2012 | Thomas et al. | |
| 2002/0028706 | A1 | 3/2002 | Barnard et al. | |
| 2002/0039919 | A1 | 4/2002 | Joshi et al. | |
| 2003/0013516 | A1 | 1/2003 | Walker et al. | |
| 2003/0064783 | A1 | 4/2003 | Baerlocher et al. | |
| 2003/0064807 | A1 | 4/2003 | Walker et al. | |
| 2003/0224852 | A1 | 12/2003 | Walker et al. | |
| 2004/0132525 | A1 | 7/2004 | Baerlocher et al. | |
| 2004/0152503 | A1 | 8/2004 | Lind et al. | |
| 2005/0003886 | A1 | 1/2005 | Englman et al. | |
| 2005/0037836 | A1 | 2/2005 | Gilmore et al. | |
| 2005/0245309 | A1 | 11/2005 | Englman | |
| 2006/0009283 | A1 | 1/2006 | Englman et al. | |
| 2006/0030391 | A1 | 2/2006 | Casey et al. | |
| 2006/0046807 | A1 | 3/2006 | Sanchez | |
| 2006/0111169 | A1 | 5/2006 | Hornik et al. | |
| 2006/0135243 | A1 | 6/2006 | Englman et al. | |
| 2007/0021200 | A1 | 1/2007 | Fox et al. | |
| 2007/0155464 | A1 | 7/2007 | Baerlocher et al. | |
| 2007/0259713 | A1 | 11/2007 | Fiden et al. | |
| 2008/0032800 | A1 | 2/2008 | Liu et al. | |
| 2008/0045295 | A1 | 2/2008 | Walker et al. | |
| 2008/0059304 | A1 | 3/2008 | Kimsey | |
| 2008/0076519 | A1 | 3/2008 | Chim | |
| 2008/0132325 | A1 | 6/2008 | Oles et al. | |
| 2008/0220851 | A1 | 9/2008 | Glavich et al. | |
| 2009/0048918 | A1 | 2/2009 | Dawson et al. | |
| 2009/0111567 | A1 | 4/2009 | Park | |
| 2009/0117969 | A1 | 5/2009 | Englman | |
| 2009/0186692 | A1 | 7/2009 | Thomas et al. | |
| 2009/0197659 | A1 | 8/2009 | Christensen | |
| 2009/0298039 | A1 | 12/2009 | Glazier | |
| 2010/0030578 | A1 | 2/2010 | Siddique et al. | |
| 2010/0048302 | A1 | 2/2010 | Lutnick et al. | |
| 2010/0056262 | A1 | 3/2010 | Englman et al. | |
| 2010/0057478 | A1 | 3/2010 | Hamilton et al. | |
| 2010/0083139 | A1 | 4/2010 | Dawson et al. | |
| 2010/0210339 | A1 * | 8/2010 | Chamberlain et al. | 463/19 |
| 2010/0240436 | A1 | 9/2010 | Wilson et al. | |
| 2010/0248818 | A1 | 9/2010 | Aoki et al. | |
| 2010/0267442 | A1 | 10/2010 | Englman et al. | |
| 2010/0304830 | A1 | 12/2010 | Englman et al. | |
| 2010/0304862 | A1 | 12/2010 | Coleman et al. | |
| 2011/0021109 | A1 | 1/2011 | Le et al. | |
| 2011/0086702 | A1 | 4/2011 | Borst et al. | |
| 2011/0105218 | A1 | 5/2011 | Anderson et al. | |
| 2011/0201410 | A1 | 8/2011 | Englman et al. | |
| 2011/0201414 | A1 | 8/2011 | Barclay et al. | |
| 2011/0223993 | A1 | 9/2011 | Allen et al. | |
| 2012/0094739 | A1 | 4/2012 | Louie | |
| 2012/0122545 | A1 * | 5/2012 | Watkins et al. | 463/20 |
| 2012/0122591 | A1 | 5/2012 | Englman et al. | |
| 2013/0065662 | A1 * | 3/2013 | Watkins et al. | 463/20 |
| 2013/0116032 | A1 * | 5/2013 | Lutnick | 463/17 |
| 2013/0150150 | A1 * | 6/2013 | Allen et al. | 463/25 |

OTHER PUBLICATIONS

Written Opinion of the International Search Authority dated Jan. 11, 2012, in PCT application No. PCT/US2011/046639 (5 pages).

PCT, International Search Report for PCT/US2011/031462 dated Jun. 17, 2011 (2 pages).

PCT, Written Opinion of the International Searching Authority for PCT/US2011/031462 dated Jun. 17, 2011 (6 pages).

* cited by examiner

WAGERING GAME, GAMING MACHINE, NETWORKED GAMING SYSTEM AND METHOD WITH A BASE GAME AND A SIMULTANEOUS BONUS CURRENCY GAME

CROSS-REFERENCE TO RELATED APPLICATIONS

The Applicants claim the benefit, under 35 U.S.C. §119(e), of U.S. Provisional Patent Application No. 61/707,410 filed Sep. 28, 2012, and entitled "Wagering Game, Gaming Machine, Networked Gaming System And Method With A Base Game And Simultaneous Bonus Currency Game." This application is further a continuation-in-part of co-pending U.S. patent application Ser. No. 13/221,819 filed Aug. 30, 2011, and entitled "Wagering Game, Gaming Machine, Networked Gaming System And Method With A Simultaneous Secondary Game", which claims the benefit, under 35 U.S.C. §119(e), of U.S. Provisional Patent Application No. 61/413,433 filed Nov. 13, 2010, and entitled "Wagering Game, Gaming Machine, Networked Gaming System And Method With A Simultaneous Secondary Game." The entire content of these applications are incorporated herein by this reference. This application is further a continuation-in-part of co-pending U.S. patent application Ser. No. 13/250,787 filed Sep. 30, 2011 and entitled "Wagering Game, Gaming Machine, Gaming System, and Method With An Embedded Bonus Game", which is a continuation-in-part of U.S. patent application Ser. No. 13/195,037, filed Aug. 1, 2011, and entitled "Wagering Game, Gaming Machine, Gaming System and Method With A Player-Determinable Feature Game Aspect", which claims the benefit under 35 U.S.C. §119(e), of U.S. Provisional Patent Application No. 61/371,532 filed Aug. 6, 2010, and entitled "Wagering Game, Gaming Machine, Gaming System and Method With A Player-Determinable Feature Game Aspect." The entire content of these applications are incorporated herein by this reference. This application further is a continuation-in-part of co-pending U.S. patent application Ser. No. 12/818,402 filed Jun. 18, 2010 and entitled "Wagering Game, Gaming Machine And Networked Gaming System With Customizable Player Avatar", which claims the benefit under 35 U.S.C. §119(e), of U.S. Provisional Patent Application No. 61/321,406 filed Apr. 6, 2010, and entitled "Wagering Game, Gaming Machine And Networked Gaming System With Customizable Player Avatar." The entire content of these applications are hereby incorporated herein by reference.

COPYRIGHT NOTICE

A portion of the disclosure of this patent document contains material which is subject to copyright protection. The copyright owner has no objection to the facsimile reproduction of the patent document or the patent disclosure as it appears in the U.S. Patent and Trademark Office patent files or records, but otherwise reserves all rights of copyright whatsoever.

FIELD OF THE INVENTION

This invention relates to wagering games, gaming machines, networked gaming systems and associated methods. More particularly, the invention relates to wagering games, gaming devices, networked gaming systems, and associated methods including simultaneously operable and distinct primary and secondary games.

BACKGROUND

A large number of different gaming machines have been developed to provide various formats and graphic presentations for conducting wagering games and presenting wagering game results.

There continues to be a need for wagering games which maintain the player's interest and generate excitement to enhance the player's gaming experience.

SUMMARY OF THE INVENTION

The present invention includes wagering games, gaming machines, networked gaming systems and methods with a bonus currency game operable with the primary game. When a player initiates play of the primary game, the bonus currency game is initiated as well. The bonus currency game includes a set of target symbols which have corresponding bonus currency values such that, when a target symbol is activated, such as by a random or quasi-random determination, the bonus currency value associated with the target symbol is awarded to the player.

After a player accumulates bonus currency, the player may utilize the currency to purchase various available online items, such as game plays in an arcade.

These and other features of the invention will be apparent from the following description of the illustrative embodiments, considered along with the accompanying drawings.

DESCRIPTION OF ILLUSTRATIVE EMBODIMENTS

Figure 1A:
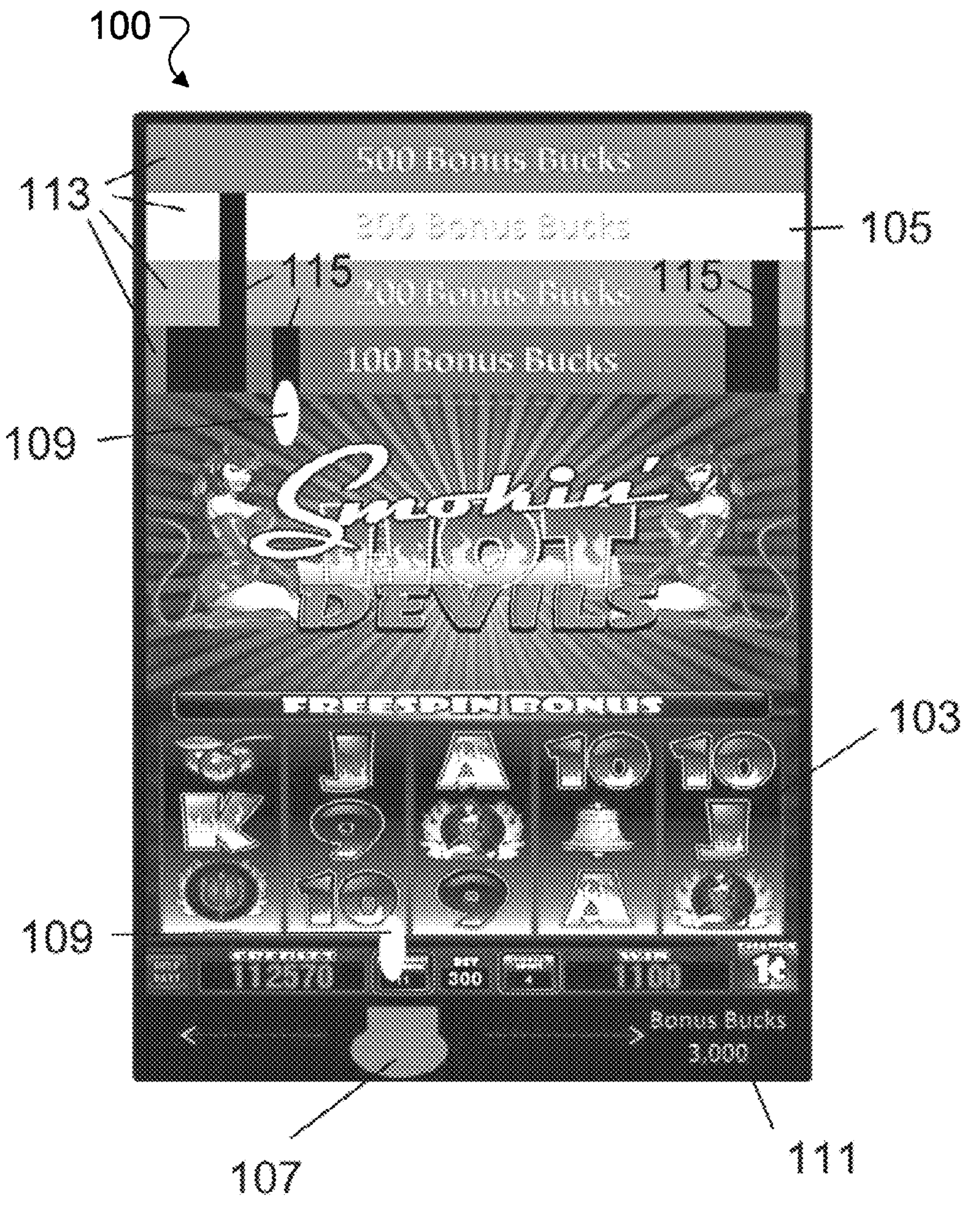
FIG. 1A is a screenshot of a primary display in which a primary game and bonus currency game are simultaneously and independently operable in accordance with one or more embodiments of the present invention.

Referring to FIG. 1A, a screenshot of a primary display 100 in which a primary (base) game 103 (Multimedia Games 'Smokin' Hot Devils) and bonus currency game 105 are simultaneously and independently operable in accordance with one or more embodiments of the present invention.

In one or more embodiments, when the base game 103 is initiated, a projectile device 107 may be shown to slide side to side as indicated by the arrows and may automatically launch a projectile 109 or projectile 109 may be launched with a launch button (not shown) by the player or the player may tap on the projectile device 107 while the base game reels are spinning to launch one or more projectiles 109. For example, the 'Play' button used to activate the base game may be used subsequently to initiate launch of a projectile for a period of time while the base game reels are spinning; alternatively, another button may be programmed on a button deck for launching projectiles. In other instances, the projectile device 109 may have a fixed or moving location, but swivel about an axis to provide a player with the opportunity to select the angle of the trajectory of a given projectile 109 and the currency game processor may or may not vary the energy or other physics aspects including the trajectory to yield a result within game parameters. See, e.g. Multimedia Games' Moneyball and the associated patent application incorporated herewith.

In some cases, one projectile 109 may be launched with one play of the primary game. In other cases, more than one projectile 109 may be launched during a single play of the base game. For example, in some cases, the number of projectiles available for launch may be determined based on the number of lines wagered and/or number of credits wagered per line. In some cases, an auto/manual launch mode button may be provided, such that when the auto launch is selected, the projectile device may randomly or quasi-randomly launch one or more projectiles to the maximum number of projectiles allocated to the player during the base game play.

In some cases, a Bonus Bucks field (meter) 111 may be displayed to show the player the number of Bonus Bucks accrued to the player. Additionally, there may be a Projectile field (not shown) displayed to show the player the number of unused projectiles available during a given base game play. In some instances, one or more unused projectiles for a given base game play may be carried over to a subsequent base game play; in other cases, any unused projectiles are eliminated but the Projectile field is replenished with one or more projectiles on initiation of a subsequent base game play.

In some instances, a Prize Redemption field (not shown) may also be displayed, either on the main display or through a Help screen, to show the player various options for using the player's accumulated Bonus Bucks and the threshold number of Bonus Bucks to access the options. For example, a virtual amusement park may be accessed after a player has accumulated at least three thousand Bonus Bucks.

In one or more instances, the projectiles 109 may have varying levels of energy that may be determined randomly or quasi-randomly by the bonus currency game processor such that based on the amount of energy, the projectiles may reach one of the bonus currency levels 113. In such cases, some of the projectiles may not have enough energy to reach the lowest currency level 113, e.g. 100 bonus bucks, while the highest energy projectile may achieve the highest currency level 113, e.g. 500. In some cases, the projectiles may be shown to glide upwards on the screen towards the currency levels and may depending upon their energy levels be able to achieve a currency level 113 objective without any obstructions placed in their path.

In one or more embodiments, the bonus currency game may enable a player to apply skill in the launch of one or more projectiles 109. For example, in order to obtain Bonus Bucks, the player may be required to launch a projectile such that the projectile enters a chute (bonus block) 115. In such case, depending upon the chute 115 that the projectile enters, the player may be awarded Bonus Bucks at the corresponding currency level. For example, one chute 115 may reach and correspond to the highest currency level 113, e.g. 500 Bonus Bucks, while most chutes 115 may reach and correspond to the lowest currency level 113. In some instances, the chutes 115 may span a small portion of the display, such that most projectiles would fail to acquire a target chute 115 and no Bonus Bucks would be awarded. In other instances, the chutes 115 may span most or all of the width of the display, such that a launched projectile always or more often than not may achieve at least the lowest currency level 113. In some instances, the position of the chutes may remain fixed; in other instances, the chutes may move to make it more difficult for a player to enter a chute. In an example embodiment, the chutes 115 may comprise planets and the projectiles 109 may comprise meteors, such as fiery meteors, which are launched towards the planets, such as may be located in an upper area of the display; each planet may be associated with a Bonus Bucks award, e.g. 500, 300, 200, 100, such that when a meteor strikes a planet, a corresponding award may be provided to the player.

In various cases, one or more obstructions (not shown), e.g. asteroids, may be located in fixed or floating locations or may randomly be projected across the paths of the projectiles 109, such that one or more projectiles 109 may be either deflected or destroyed prior to achieving their objective. In some cases, there may be a deflector (not shown) that may shield the currency levels 113 on an intermittent basis. In some instances, a player may be able to utilize a measure of skill to time the launch of a projectile 109 to achieve its objective when the deflector is 'off' or to avoid any obstructions in its trajectory. In some instances, the projectiles 109 may be directed on a trajectory to reach a horizontal edge of the display and be re-directed similar to a bank shot in billiards.

In one or more instances, more than one projectile 109 may be launched substantially simultaneously or sequentially during a base game and the total amount accumulated during the play may be used to determine whether a threshold amount has been met to trigger a secondary (currency) game bonus feature (e.g. an amusement park game). In some cases, there may be no accumulation of Bonus Bucks except for the given spin and the amount of Bonus Bucks may be reset to zero at the initiation of either a new wager or a subsequent base game play. In other cases, the Bonus Bucks are accumulated and persist for subsequent base game plays. In some instances, the Bonus Bucks may persist only for the gaming session; and, in other instances, the Bonus Bucks may be stored and maintained on a server storing player Bonus Bucks, such as the player account server. In some instances, the base game may include a trigger for awarding additional projectiles to be launched prior to the initiation of a next wager and base game play, so that the player may have additional opportunities to obtain Bonus Bucks and achieve a threshold value triggering a bonus currency bonus event (which may include the option whether to play or engage in one or more optional games or events wherein the Bonus Bucks may be used as currency).

In one or more cases, the number of projectiles may be randomly awarded upon the initiation of a base game play. In other cases, there may be a direct correlation between the amount of projectiles and the wager. In one or more cases, Bonus Bucks may be directly awarded upon the initiation of a base game; and the award may be random or there may be a fixed amount awarded based on the wager of the base game. Direct awards may be either in addition to or in place of projectile awards.

Figure 1B:
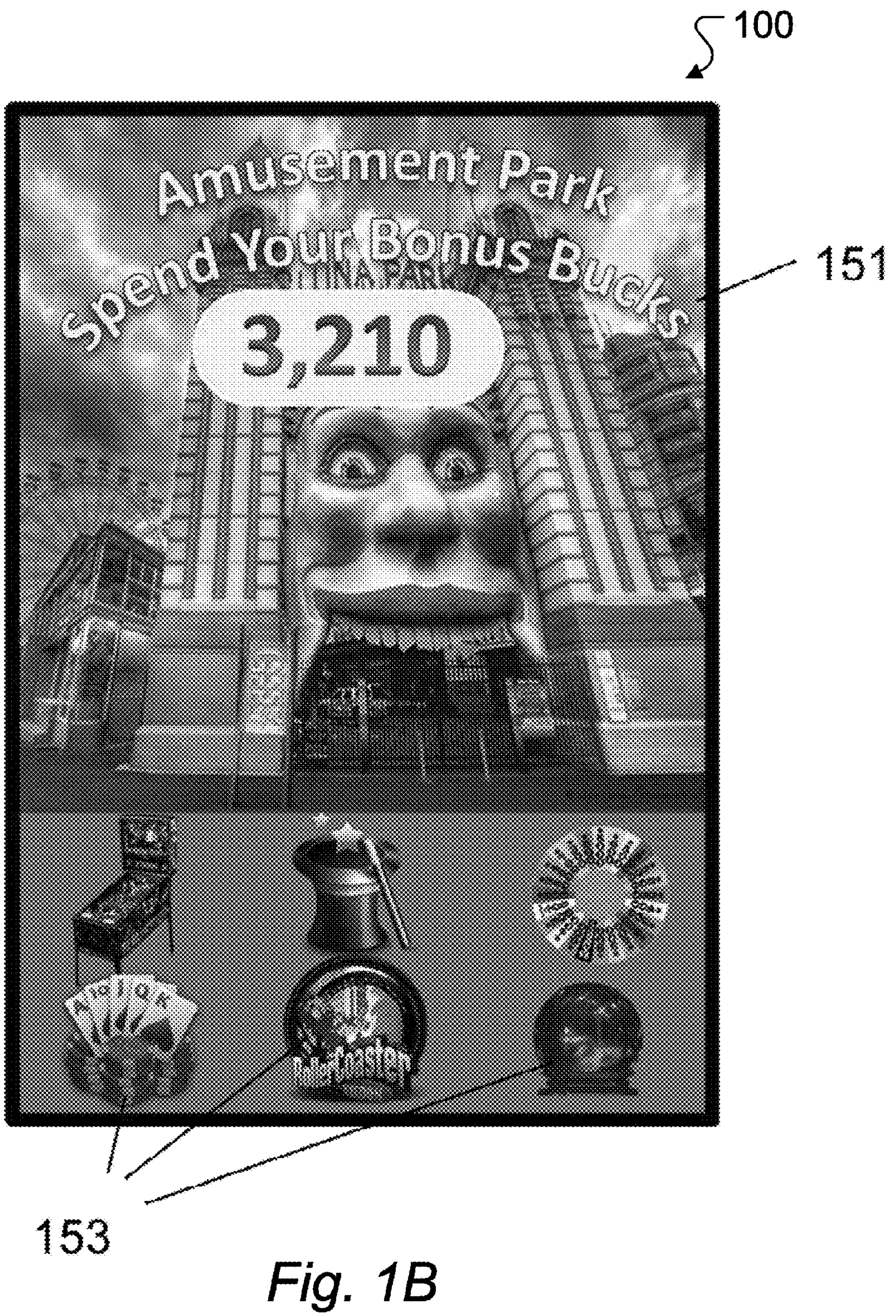
FIG. 1B is a screenshot of a primary display in which a non-wagering game is shown being offered to a player who has achieved a threshold number of bonus currency in accordance with one or more embodiments of the present invention.

Referring to FIG. 1B, a screenshot of a primary display 100 in which an amusement park facility 151 (currency or secondary game bonus feature) is shown being offered to a player who has achieved a threshold number of bonus currency in accordance with one or more embodiments of the present invention. In one or more embodiments, various options may be provided to a player to spend the virtual Bonus Bucks currency at a given facility 151. In some instances, once a player achieves a threshold number of Bonus Bucks to access one or more options, the respective options may become enabled. One or more of the options may be for a player to access a facility 151, such as an amusement park where the player can spend the player's Bonus Bucks on various games or activities 153 and potentially win credits which may be incremented on the credit meter of the gaming device or win additional Bonus Bucks. Additional options that may be provided may include the option to purchase one or more virtual animated or inanimate icons or avatars or accessories that may be displayed on primary display 100 during base game play or even during bonus option play and may provide interactive entertainment to add to the game or play experience of the player. See, e.g. the associated patent applications incorporated herein.

For example, a Redemption Table may be shown in a Redemption field and list various options and corresponding threshold number of Bonus Bucks. When the player achieves a threshold number for a given option, a button associated with the option may become active and enable the player to press (select) the button to access the option. Once the button is selected by the player, the Bonus Currency processor may respond according to its programming to cause a screen to display information or images about the option on primary display 100 or another available display, from which the player may interact in accordance with the option.

In one or more instances, one of the options may be for a player to enjoy various types of games or activities at an arcade or amusement park. When a player achieves the threshold amount, a tombstone may display on primary display 100 or another display indicating that the player has achieved the threshold amount for the option and may further display a query whether the player would like to use the player's Bonus Bucks to select the option. Along with the query may be an activated element or area on the screen that a player may select to use the Bonus Bucks to access the option or defer and use the Bonus Bucks at another time or for a different option.

In the example virtual amusement park option (feature), a player may be provided the opportunity to engage in various games and activities 153 as may be found in an amusement park, such as cards, magic tricks, roller coaster, fortune teller, wheel spin, and pinball. In each game or activity, the player may purchase a game play or activity and may have the opportunity to win prizes, credits, and/or virtual currency. Some of the win opportunities may be awarded randomly or quasi-randomly and others may be awarded based on skill or quasi-skill. Once the player has used up the Bonus Bucks, the screen display will revert to the base game 103 and bonus currency game 105. Alternatively, a player may elect to return to the base game and bonus currency game prior to using all of the player's Bonus Bucks, such as by pressing a 'Return to Base Game' button (not shown).

Figure 2:
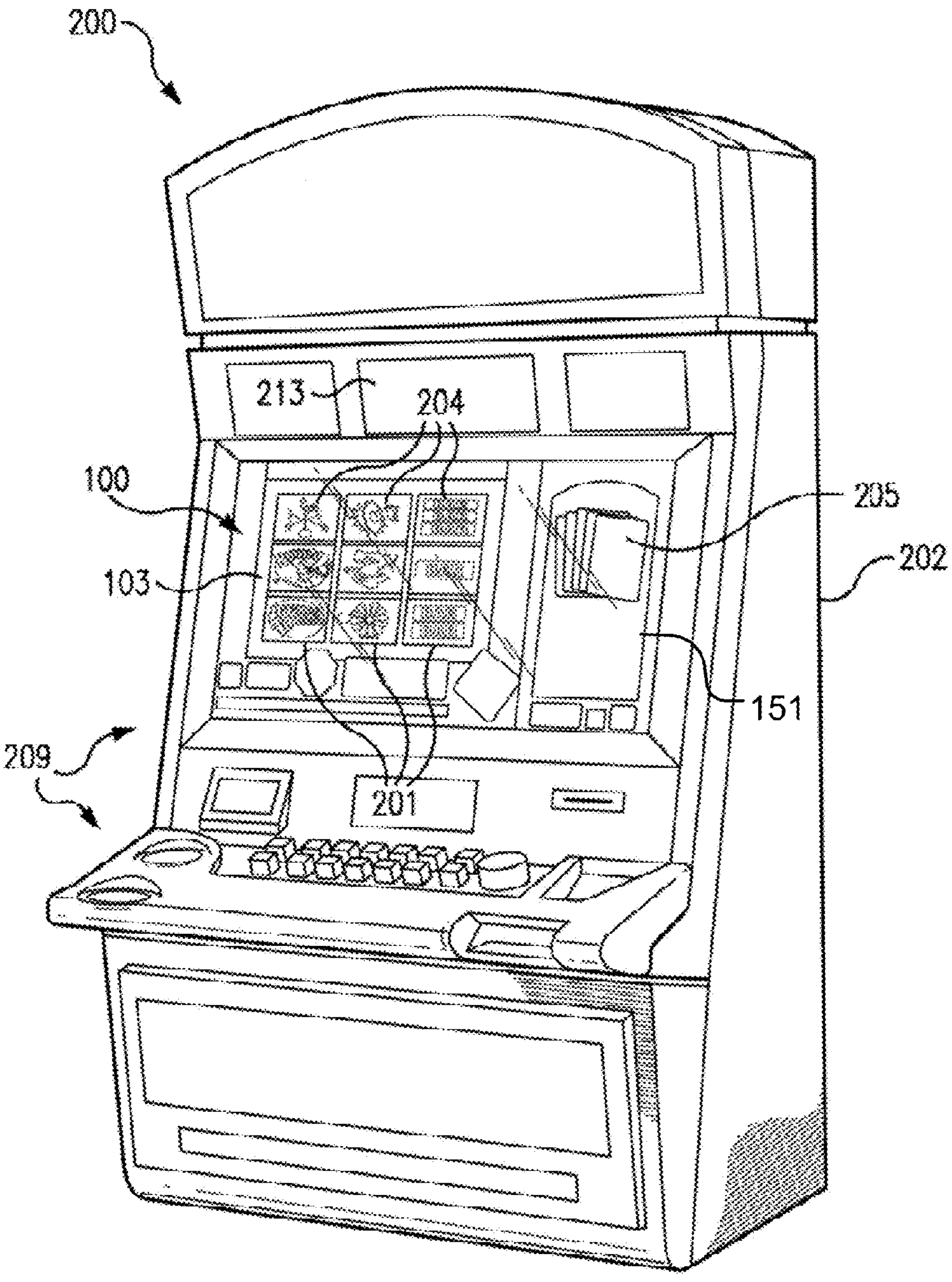
FIG. 2 is a front perspective view of an example upright gaming machine according to one or more embodiments.

Referring to FIG. 2, the gaming machine 200 includes a primary display device 100 which is shown displaying an example reel-based base game 103 (Multimedia Games 'Smokin' Hot Devils) and bonus currency (secondary) game feature 151 in accordance with one or more embodiments of the present invention. The example secondary game feature 151 has an undisclosed card hand 205 displayed after the player selected the card game from a selection option such as the example screen shown in FIG. 1B. Depending upon the embodiment, both base games 103 and secondary game feature 151 may be respectively wagered upon with credits from the credit meter and bonus currency from the Bonus Bucks meter 111 (FIG. 1A), and, simultaneously or sequentially operable by one or more processors, have outcomes determinable either by independent RNGs (or other result generation techniques), and have awards paid separately or collectively depending upon the type of award from the secondary game feature 151 (e.g. Bonus Bucks or credits). For example, selectable buttons may be provided for a player to place a wager on base game 103 plus secondary game feature 151. A game processor (or game processors) may accept the wager/s (or input/s), and the player may press a 'PLAY' button to initiate play of either or both games. Alternatively, the game processor may automatically initiate play of the game once a wager has been entered and credits and/or Bonus Bucks are deducted by the processor in an acceptance of the wagers.

In one or more embodiments, a player selectable menu may be provided for a player to select one of several available options 153 (FIG. 1B) available with currency game 105 such as secondary game bonus feature 151 shown in FIG. 2. While bonus feature 151 is shown on the side of the base game with both displayed on primary display 100, bonus feature 151 may be displayed on the full screen area. In various instances, more than one bonus feature 151 may be played and displayed simultaneously on primary display 100 or another available display.

Display device 100 may be a conventional video display device (for example, a landscape mode display with a 9×6 aspect ratio) with a touch-sensitive user interface. Example implementations may include dedicated gaming machines (e.g. a Multimedia Games® wide or slim body or slant video or mechanical reel display cabinet), networked tablet computers (e.g. Apple® iPad®), networked personal computers, etc. on which base game 103 and currency game 105 may be displayed. The games may be displayed under the control of a local or remote game processor configured to execute base and secondary game coding responsive to player inputs (e.g. wager and game play requests). The graphics shown in FIGS. 1A and 2 are examples in which the display area is larger for the base game 103 (about ⅔ of the display area of display 100) and smaller for secondary game feature 105 (about ⅓ of the display area of display 100). However, there is no limitation as to the relative display space taken up by a base and secondary game according the present invention. Also, in one or more embodiments, display device 100 may be controllable (for example, via touch screen controls) to allow the player to modify the display area of the respective games. For example, display device 100 may comprise a touch screen display and may allow the modification of the screen area taken up by base game 103 and secondary game 105 in response to a touch in the area of the border between the games and a slide of the touch horizontally in either direction to increase or decrease the display areas of the respective games. In one or more embodiments, the display area or window associated with either of the games may be moveable by a player from one position to another, such as by tapping the area of the display associated with a given game and sliding the player's finger to a position where the player desires to view the selected game (i.e. similar to a Microsoft Windows® application wherein a window may be re-positioned or its size modified according to the user's preference). In a further variation, the given game window may be modified in size by the player selecting a corner of the game window and sliding it inward or outward to shrink or enlarge the given game display. For example, a player may tap the display area associated with secondary game 105 in FIG. 2 and slide a finger to a position centered at the top of display 100 and lift the finger from the display, touch a corner of the base game display area and slide the finger to re-size the area (such as to stack secondary game 105 above base game 103 on display 100, such as shown in FIG. 1A). In a further embodiment, instead of enabling an individual to change sizes or positions directly, a display menu may be programmed to appear on display device 100 (such as by a player tapping a corner of display 100) and the display menu may provide a selection of base and secondary game size and position arrangements for a player to choose from. For example, a display menu may include a side-by-side box with base game 103 on the left and secondary game 105 on the right, a side-by-side box with base game 103 on the right and secondary game 105 on the left, stacked boxes with base game 103 on the top and secondary game 105 on the bottom, and stacked boxes with base game 103 on the bottom and secondary game 105 on the top whereon a player may select an image to move the positions of base game 103 and secondary game 105 on display 100 and the player may also have an option to increase or decrease the size of a given image by selecting the border area and sliding the player's finger along the screen in a horizontal direction (in the case of a side-by-side arrangement) or vertically (in the case of a stacked arrangement).

Secondary game 105 may have some sounds and animations to correspond to game activity, for example, an anticipation sound may play as a projectile achieves a Bonus Bucks currency level 113 or during a currency game card feature when the card result is revealed, and, a special celebratory sound may play after a Bonus Bucks currency level 113 is achieved or winning hand is revealed. There may also be different sounds for different prize levels (e.g. bottom 2 prizes, middle 2 prizes, top 3 prizes). Also, the gaming machine may produce a sound upon activation of secondary game feature 151 or at some other point associated with the secondary game.

Referring again to FIG. 2, gaming machine 200 is shown including primary display device 100 with which a set of reels 201 are shown or displayed in a base game display area 103 and a poker hand is shown or displayed in a secondary game feature display area 205 in accordance with one or more embodiments. Primary display device 100 and the other components of gaming machine 200 are all mounted on or about a cabinet 202. During primary game operation or attract mode, a base game paytable may be displayed on display 100 (or another available display) by accessing the help screen to view various base game winning outcomes associated with various awards and additional information regarding game play including criteria or requirements to activate and/or play the secondary game features, such as shown in FIGS. 1A and 1B. A secondary game information document and/or paytable may also be shown through the base game help screen, through a separate help screen, or be directly viewable in a secondary game display area. In an alternative embodiment, a top box display may display the respective paytables of the base game, secondary game, or both.

Gaming machine 200 is also shown to include middle display 213 which may display a server-based game (such as bingo, in the case of a Class II gaming machine), advertising or other content as may be provided over a network or through the gaming machine. Gaming machine 200 further includes user interface 209 with which a patron may place wagers and initiate play of one or more games at gaming machine 200. User interface 209 may include: a commercially available player tracking interface unit, such as a Bally iView® unit, a button deck including buttons for selecting paylines and wagers per payline in the base game shown in base game area 103, one or more additional buttons for launching projectiles associated with the secondary game, and a "Play" button and/or handle with which the player may initiate play of the base and/or secondary game features selected by the player. The button deck may be provided on a touch panel (such as on the lower portion of display device 100) in addition to or in the alternative to a physical button deck. The player tracking unit may include a card reader, a bill acceptor/printer, and player display which may display a greeting to the player, player points, a menu for communicating with player account server 409 (FIG. 5), and other casino operator content.

As in the reel games shown in the figures, each reel includes a series of symbols 204 viewable on display device 100 (e.g. through a glass window or transparent display, in the case of mechanical reels, or, as displayed in a video format). With the reels in a stationary position, the symbols visible on display device 100 represent an array of symbols through which various paylines may be defined. During a wagering game (as may be initiated by a player by placing a wager and pressing a "Play" button), the reels may be simulated to spin (or electro-mechanically spun in the case of mechanical reels) about an axle under the control of a game processor which randomly or pseudo-randomly determines the game outcome and causes the reels to stop in accordance with the determined game outcome. Alternatively, a game processor may randomly or pseudo-randomly stop the reels and then evaluate the displayed symbols in light of the applicable paytable to identify the reel-type game outcome. Further alternatives in providing outcomes for the reel-type base game and secondary game will be described further below.

One or more paylines, combinations, or patterns of the symbols including those visible in display 100 may be correlated to a game result payable in accordance with a paytable such as may be displayed with respect to base game shown in base game display area 103. For example, a game with five reels and displaying four symbol locations per reel may have four paylines which extend horizontally across each reel and many others which may zig and zag across the various reel symbol locations both on and off the viewable display area. A patron may wager on one or more of the paylines during each game play. Display device 100 may thereby be used to display game results to one or more patrons who may view gaming machine 200 and the game processor may make payment to the patron by incrementing a credit meter for winning outcomes of paylines in accordance with the paytable and the player's wager. In example gaming machine 200, only one payline may be provided horizontally across the three reels 201, and a player may be provided the option to bet one, two, or three credits on the payline to play the base game in base game display area 103, and a fourth or additional credits to the secondary game play displayed in secondary game display area 205. While example gaming machine 200 includes a set of three reels 201, various numbers of reels and paylines may be selected or utilized in an implementation of one or more embodiments, such as one, two, three, four, five (as shown in FIG. 1A), six, or seven reels, and so forth.

Primary display device 100 may comprise a single display device or may comprise two or more display devices (for example, two flat panel display devices in over- or underlaying relation to each other, or in a side-by-side arrangement). In some implementations, primary display device 100 may comprise a touch-sensitive display panel, such as a flat panel LCD or LED display, which may be programmed to display an opaque or thematic frame image (which may include video and/or still images) except over a reel display area. Primary display device 100 may be programmed to be transparent or translucent during game play of the primary wagering game, so that the patron may view the game presentation in the reel display area where a set of mechanical reels may be viewable or a set of video reels may be displayed by an underlying display. In addition, the entire display surface of primary display device 100 (or a portion thereof) may be configured to respond to the patron's touch such as to select paylines, select credits wagered per payline, and/or play the base game and/or secondary game.

In one or more alternative embodiments, primary display device 100 may be programmed to display a bonus or feature game that may be triggered by the appearance of one or more special symbols or other random event. For example, when a bonus or feature game is triggered for either the base or secondary game, primary display device 100 (or a portion thereof) may be transformed to display content associated with the bonus or feature game and once the bonus or feature game is complete, primary display device 100 may revert to the primary and secondary game display state. In particular, a player may use such touch screen portion to select the button or item in order to cause the game to perform additional steps and/or provide one or more bonus or feature game outcomes and awards to the player.

In one or more alternative embodiments, gaming machine 200 may include mechanical reels with fixed or dynamic symbols. Conventionally, mechanical reels include reel strips with fixed symbols. However, reel strips may be implemented using FOLED (flexible organic LED), for example, or comparable reel strips wherein one or more symbols may be programmed dynamically to vary the symbol and/or its appearance, either from one fixed image to another (such as changing a symbol to a wild symbol or changing a series of symbols to wild symbols), or, from a fixed image to a dynamic (e.g. animated or video) image or a set of miniature video reels. In various instances when a symbol changes to another symbol, a bonus or enhanced award may be paid in accordance with the pay table, or a bonus (a fixed or progressive amount) may be paid separate from the pay table.

In the event that the payment is a progressive payout, a progressive pool may be generated from an operator's marketing dollars or from play at one or more gaming machines which may be eligible for the progressive award. The progressive pool may be maintained by a progressive server (such as server 407 shown in FIG. 4). In cases when a progressive prize is associated with an individual gaming device, the progressive pool may be maintained through a processor (such as the game processor) associated with the gaming device. In cases when the progressive associated with a game is personal to the player, the amount of the progressive award may be maintained by a processor associated with the game while the player is playing the particular device, and when the player's gaming session ends, the amount accumulated towards the personal progressive award, if not won, may be forwarded to a server, such as player account server 409 in FIG. 4, which may forward the information to a subsequent device when the player returns to play or selects another gaming machine on which to play.

Another conventional game display approach is to implement reels virtually (video reels) on a display, such as primary display device 100 as shown in the figures discussed herein. In the case of virtual displays of the reels, the symbols may be fixed or animated on each of the reels. In one or more embodiments, the appearance of one or more special symbols in the base game shown in base game display area 203 may trigger a free play of the secondary game shown in secondary game display area 205 and provide an award according to the standard paytable. Alternatively, the secondary game paytable may be modified to provide an interactive element with the base game. For example, a multiplier symbol may appear on a winning payline or as a scatter symbol in the base game shown in base game display area 203, which may trigger the secondary game shown in secondary game display area 151 to modify one or more awards with a multiplier value (e.g. 1×, 2×, 3×, etc.). Alternatively or additionally, one or more free base game spins may provide a game presentation and outcome, and, based on the outcome, an associated multiplier award may be applied to one or more paylines on the base game to determine the award that is paid to the player (e.g. credited to a credit meter on the gaming machine), which may be based on the currently displayed outcome and/or one or more subsequent base game plays. If two or more multiplier symbols appear in the base game, the multipliers associated with the secondary game paytable may be multiplied by two or more. In another example, one or more free spin symbols may appear in the base game which may trigger the secondary game to modify one or more awards in its paytable (e.g. Bonus Bucks currency levels 113) to include a number of free spins and depending on the secondary game outcome, the associated number of free spins may be applied to the base game. The associated number may be multiplied by the number of free spin symbols that appeared in the base game to trigger the secondary game, and the secondary game process may be repeated to add to the number of remaining base game free reel spins, if one or more free spin symbols appear on subsequent base game plays.

In one or more alternative embodiments, overlapping display panels may be implemented to generate video or display effects over the primary game reels. For example, the reel display area may be implemented as a transmissive (e.g. Aruze or WMS transmissive display panels) display or a transparent (e.g. Bally transparent display panels) display configured to display visual effects together (or cooperatively) with the primary reels under the control of the game processor during the operation of a wagering game. In the case of virtual reels, the virtual reels may be recessed a distance from an overlaying display and segregated by dividers similar to dividers separating mechanical reels, which may provide a spatial characteristic (e.g. IGT PureDepth® display panels). In either case, the overlapping display may be touch sensitive and configured to interact with the player by transmitting and receiving signals as described above.

In one or more embodiments, the game processor operating the wagering game and interacting with various peripheral components in many instances is implemented as a microprocessor, such as an Intel Pentium® or Core® microprocessor, on a printed circuit board including one or more memory devices positioned within gaming machine 200. In alternative implementations, the game processor may be remote from gaming machine 200, such as on a server network (game server 403 shown in FIG. 4 for example) connected to gaming machine 200, in which case the game operation as described herein may be accomplished through network communications to control the display of the game on gaming machine 200.

Figure 3:
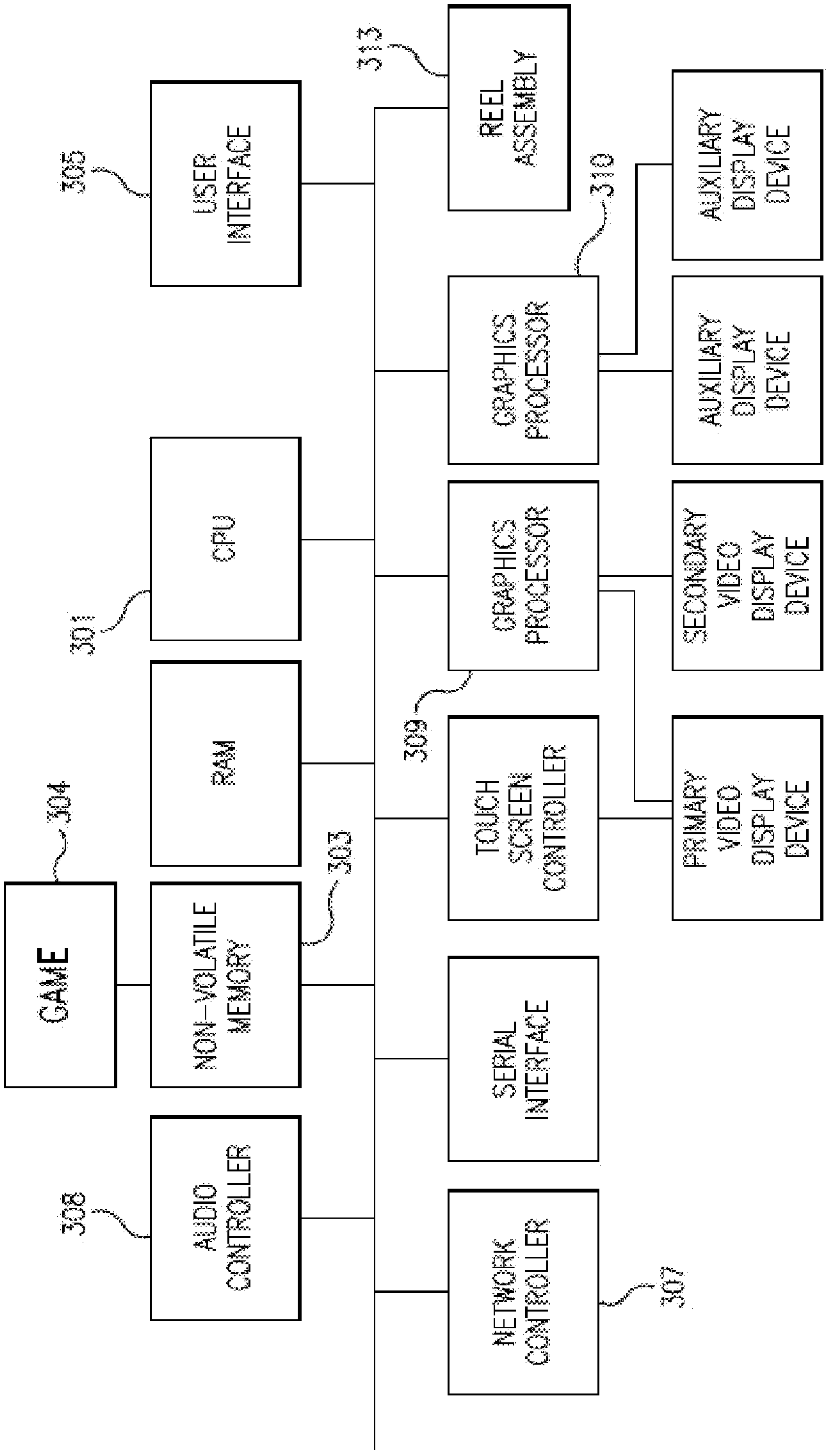
FIG. 3 is an example logic diagram of a gaming machine in accordance with one or more embodiments.

FIG. 3 shows an example logical diagram of gaming machine 200 and includes a CPU or game processor 301, memory 303 with wagering game 304, user interface 305, network controller 307, audio controller 308, graphics processors 309 and 310, and reel assembly 313. The reel assembly 313 will be included in gaming machine 200 if the gaming machine employs mechanical reels rather than or in addition to video-generated reels. Game processor 301 in this example implementation may comprise a conventional microprocessor, such as an Intel Pentium® or Core® microprocessor, mounted on a printed circuit board with supporting ports, drivers, memory, and coding to communicate with and control gaming machine operations, such as through the execution of coding stored in memory 303 including one or more wagering games 304. Game processor 301 connects to user interface 305 such that a player may enter input information and game processor 301 may respond according to its programming, such as to apply a wager and initiate execution of a game.

Game processor 301 also may connect through network controller 307 to a gaming network, such as example casino server network 400 which will be described below in connection with FIG. 4. Through its network connection, gaming machine 200 may be monitored by an operator through one or more servers such as to assure proper operation, and, data and information may be shared between gaming machine 200 and respective of the servers in the network such as to accumulate or provide player promotional value, to provide server-based games, or to pay server-based awards.

Generally, activity at gaming machine 200 is initiated by a player inserting currency and/or a player card into an appropriate receiving device such as a bill acceptor for currency and card reader for the player card. Upon insertion, a signal is sent to game processor 301. In the case of the insertion of a player card, the card reader transmits card information which is directed through network controller 307 to a player tracking server connected to the network in which the gaming machine is included. Player data is transmitted to gaming machine 200 and, responsive to the data, game processor 301 may execute coding causing player data and a display command to be transmitted to one of the graphics processors 309 or 310 instructing the graphics processors to cause player information to be displayed on a respective display. Game processor 301 may also transmit commands to audio controller 307 to direct the controller to cause an audio greeting to be produced through one or more speakers associated with the gaming machine. Concurrently, the bill acceptor sends a signal to game processor 301 which may include an identification of the currency that has been read, and game processor 301 in accordance with its coding may convert the currency amount to credits and transmit a store and display signal to a credit meter. Once credits have been associated with the credit meter, the player may select the number of paylines and credits per line that the player wishes to wager, whereupon game processor 301, in accordance with its program code, receives the wager information from user interface 305, transmits accounting and display information to the payline ("Lines"), credits per payline ("Bet per Line"), and total bet ("Total Bet") meters and displays of the gaming machine, transmits an update to the credit meter and display ("Credits") deducting the amount of the total bet, and initiates the wagering game.

In the case of Class III gaming devices, when a game is initiated, a random number generator (RNG) may be operated by game processor 301 to determine the game outcome (either directly or by randomly selecting reel stop positions and evaluating those positions to identify an outcome). Commonly, game processor 301 is positioned within gaming machine 200 and configured to manage the operation of the gaming machine components, such as shown in FIG. 3. However, the game processor may be either onboard or external to a gaming device played by a player, such as an electronic tablet (e.g. Apple iPad® or gaming specific tablet), personal data assistant (PDA), cellular telephone (e.g. Blackberry® or Apple iPhone®), or surface table (e.g. Microsoft®/IGT® touch sensitive gaming surface table), etc. In such case, when the player places a wager and initiates play of the game through user interface 305 of the gaming device, the game processor may be onboard the device or remotely located such as within a network gaming server. In the latter case, an onboard microprocessor, controller, or digital signal processor may execute coding to transmit the wager and game request information through the network, and the remote game processor may operate an RNG to determine the game outcome.

In the case of Class II gaming devices, the overall structure of the various devices as discussed above is essentially the same with the major difference being the method of determining the game outcome. Commonly, Class II gaming devices utilize the game of bingo as the basis for determining a winning outcome where the ball draw is performed remotely by a network or central determination server (alternative games may be used for determining game outcomes, such as through a lottery drawing of a finite set of numbers, if permitted by the licensing jurisdiction). Class II gaming systems are commonly referred to central determination systems wherein pools and sub-pools of game outcomes are determined by a central server (or gaming device) and distributed amongst a set of networked gaming devices. The distribution step may be on demand, such as when a gaming device receives a game request, or sets of game outcomes may be distributed to the various networked gaming devices in which case the game processor of the requesting gaming device may select a game outcome from the set of game outcomes, such as by using an RNG or other selection process.

Additionally, Class II gaming devices, such as a bingo-based gaming device may have multiple displays, such as are shown in FIG. 2 wherein one of the displays, such as display 213 in FIG. 2, may be used to display one or more electronic bingo cards and one or more ball drawings after a game has been initiated in accordance with the game outcome that has been provided to the gaming device by a central determination server. In the case, as in FIG. 2, where the primary display comprises a set of reels, game processor 301 converts the centrally-determined game outcome to a corresponding value outcome of the reel-based game as shown in FIG. 2, and operates the reel-based game as described above and with respect to the figures. In one or more embodiments, when a player enters a wager on both the base game 103 and secondary game 105 as described above, and enters "PLAY" through an appropriate player control, a game play request may be transferred to central determination server 405 (discussed below in connection with FIG. 4) which may provide a single game outcome to the respective gaming machine 200. Game processor 301 may then initiate game presentations of both games concluding with outcomes corresponding to the game outcome provided by central determination server 405. In an alternative embodiment, central determination server 405 may provide two game outcomes (one associated with base game 103 and one associated with secondary game 105), and game processor 301 may initiate corresponding game presentations of base game 103 and secondary game 105.

In one or more embodiments, coding may be implemented and stored in memory 303, executable by game processor 301 to control game operation, display content, lighting, and audio through video, audio, reel drive motor controllers (for mechanical reels), and lighting controllers.

While the primary display has been depicted as displaying a set of reels, in one or more base game embodiments, base game 103 or secondary game 105 may comprise other types of games. For example, base game 103 or secondary game 105 may comprise a playing card-based game such as poker or blackjack, a dice-based game such as craps or a board game such as the Monopoly® game, a wheel-based game such as roulette or Wheel-of-Fortune® type prize wheel, or a competition-based game such as a car or horse race.

Figure 4:
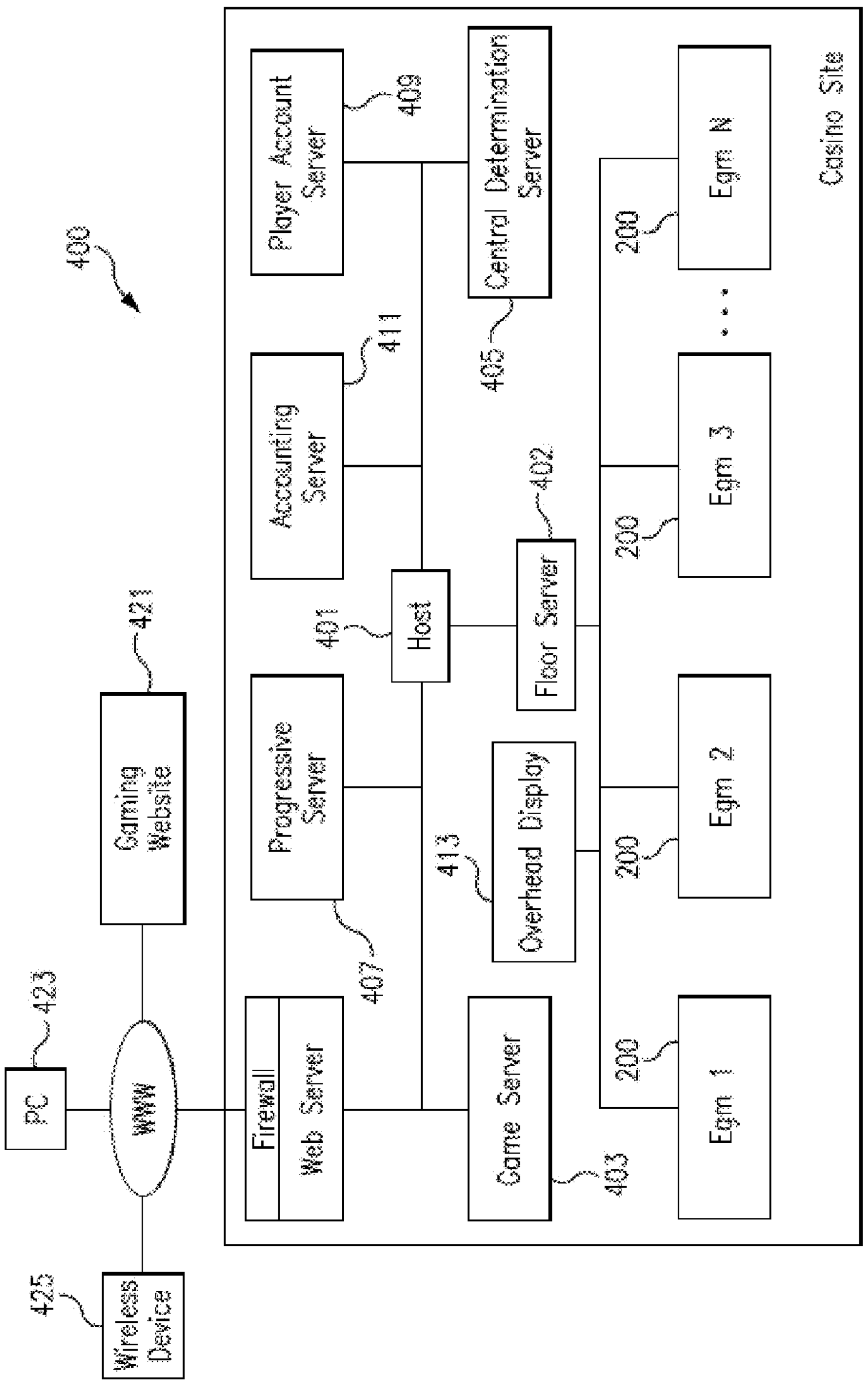
FIG. 4 is a diagrammatic representation of an example gaming network including one or more gaming machines with dual game play in accordance with one or more embodiments.

Referring to FIG. 4, a block diagram of example networked gaming system 400 associated with one or more gaming facilities is shown including one or more gaming machines 200 connected in a network with host server 401 and floor server 402. One or more of the gaming machines 200 may provide a base game 103 and secondary game 105 as discussed above. While a few servers have been shown separately in FIG. 4, it will be appreciated that the servers may be combined or split into additional servers having additional capabilities.

As shown, networked gaming machines 200 (Egm 1-Egm N) and one or more overhead displays 413 may be network connected so as to enable the content of one or more displays of gaming machines 200 to be mirrored or replayed on an overhead display. For example, the primary display content may be stored by the display controller or game processor 301 and transmitted through network controller 307 (FIG. 3) to the overhead display controller either substantially simultaneously or at a subsequent time according to either programming executed by game processor 301 (FIG. 3) or a triggering event, such as a jackpot or large win, at a respective gaming machine 200. In the event that gaming machines 200 have cameras installed, the respective players' video images may be displayed on overhead display 413 along with the content of the player's display 100 and any associated audio feed.

Game server 403 may provide server-based games and/or game services to network connected gaming devices, such as gaming machines 200 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event such as a progressive jackpot game outcome or other triggering event such as a random or pseudo-random win determination at a networked gaming device. Accounting server 411 may receive gaming data from each of the networked gaming devices, perform audit functions, and provide data for analysis programs, such as the IGT Mariposa® program bundle. Central determination server 405 may be configured to determine lottery, bingo, or other centrally determined game outcomes and provide the information to networked gaming machines 200 providing lottery and bingo-based wagering games to patrons.

Player account server 409 may maintain player account records, and store persistent player data such as accumulated player points and/or player preferences such as game personalizing selections or options. For example, the player tracking display may be programmed to display a player menu that may include a choice of personalized gaming selections that may be applied to a gaming machine 200 being played by the player.

In one or more embodiments, the player menu may be programmed to display after a player inserts a player card into the card reader. When the card is inserted, an identification code may be read from the card and transmitted to player account server 409. Player account server 409 may then cause player information to be transmitted through network controller 307 (FIG. 3) for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 301 for storing and use during the player's game play. Also, the player's selection may be transmitted to player account server 409 where it may be stored in association with the player's account for transmission to the player in future gaming sessions. The player may change selections at any time using the player tracking display at the gaming machine (which may be touch sensitive or have player-selectable buttons associated with the various display selections).

In one or more embodiments, a gaming website 421 may be accessible to players to allow players to play one or more games as described herein through the use of personal computer 423 or handheld wireless device 425 (e.g. Blackberry® cell phone, Apple Iphone®, personal data assistant (PDA), iPad®, etc.). To enter the website, a player may log in with a user name (that may be associated with the player's account information stored on player account server 409 or be accessible by a casino operator to obtain player data and provide promotional offers). Once logged in, the player may play various games on the website. The play may also use the website to make various personalizing selections and save the information so that during a next gaming session at a casino establishment the player's playing data and personalized information may be associated with the player's account and accessible at the player's selected gaming machine 200.

Referring generally to the forgoing description and the following claims, as used herein the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "presentation" as used herein is meant to refer to the display of any image and/or video performance and/or the performance of one or more sound bites or audio tracks (such as digital or analog sound tracks or information stored on a memory device and processed by an audio controller to emit sound through a speaker) whether in an attract mode or as part of a game presentation or outcome.

The above described example embodiments are intended to illustrate the principles of the invention, but not to limit the scope of the invention. Various other embodiments and modifications to these preferred embodiments may be made by those skilled in the art without departing from the scope of the present invention. In another example, one of base game 103 and secondary game 105 may be determinable by one processor (e.g. a local processor) and the other game may be determinable by another processor (e.g. a remote processor) while one of the processors or another processor may drive a presentation to be displayed on display 100 including base game 103 and secondary game 105 and culminating in outcomes according to the determinations.

In addition to the variations described above, the following variations also apply to the secondary game arrangement disclosed herein. Besides viewing the secondary game 105 as just a secondary game or separate second game, the secondary game could also be a part of the base game that is engaged with a feature bonus bet. The results of the secondary game 105 may provide additional benefits in the base game 103 or vice versa.

The invention claimed is:

1. A method for operating a dual wagering game, the method including:

selecting a base game outcome for a base game from a base set of possible base game outcomes, wherein the base game outcome is selected randomly or pseudo-randomly by a game processor;

selecting a secondary game outcome for a secondary game from a side set of possible secondary game outcomes, the side set of possible secondary game outcomes being distinct from the base set of possible base game outcomes, wherein the secondary game outcome is selected randomly or pseudo-randomly by the game processor or another processor;

displaying a base game round on a primary display of a gaming machine, the base game round including a plurality of reels being spun and stopped to produce the base game outcome;

while displaying the base game round, displaying play of a secondary game play on the primary display along with the base game round, the base game and secondary game being operable simultaneously through a game processor, the secondary game play including first graphic elements adjacent to graphic elements of the primary game, and second graphic elements animated to move through primary display areas showing the graphic elements of the base game; and awarding any prize associated with the selected base game outcome and awarding any prize associated with the selected secondary game outcome.

2. The method of claim 1, in which the primary game is conducted based upon a designated player currency wager to win credits, and the secondary game is conducted to win bonus credits redeemable only for non-cash bonus prizes.

3. The method of claim 2, in which a number of player chances in the secondary game play is based on a player wager level.

4. The method of claim 2, in which a number of player chances in the secondary game play are randomly determined upon initiation of the base game round.

5. The method of claim 2, further comprising accumulating the bonus credits over a number of base game rounds in a player session.

6. The method of claim 5, further comprising launching a bonus credit redemption sequence based upon an amount of accumulated bonus credits crossing a designated threshold.

7. The method of claim 2, further comprising triggering a number of player chances in the secondary game after conclusion of the base game round and before beginning a subsequent base game round.

8. A program product embodied on one or more tangible, non-transitory computer readable media and executable by one or more gaming processors associated with gaming machines connected through a network to operate a dual wagering game, the program product executable for:

selecting a base game outcome for a base game from a base set of possible base game outcomes, wherein the base game outcome is selected randomly or pseudo-randomly by one of the gaming processors;

selecting a secondary game outcome for a secondary game from a side set of possible secondary game outcomes, the side set of possible secondary game outcomes being distinct from the base set of possible base game outcomes, wherein the secondary game outcome is selected randomly or pseudo-randomly by one of the gaming processors;

displaying a base game round on a primary display of a gaming machine, the base game round including an array of symbol locations in a manner simulating a plurality of reels being spun and stopped to produce the base game outcome;

while displaying the base game round, displaying play of a secondary game play on the primary display along with the base game round, the secondary game play including first graphic elements adjacent to graphic elements of the base game, and second graphic elements animated to move through primary display areas showing the graphic elements of the primary game; and awarding any prize associated with the selected base game outcome and awarding any prize associated with the selected secondary game outcome.

9. The program product of claim 8, in which the primary game is conducted based upon a designated player currency wager to win credits, and the secondary game is conducted to win bonus credits redeemable only for non-cash prizes.

10. The program product of claim 9, in which a number of player chances in the secondary game play is based on a player wager level.

11. The program product of claim 9, in which a number of player chances in the secondary game play are randomly determined upon initiation of the base game round.

12. The program product of claim 9, further executable for accumulating the bonus credits over a number of base game rounds in a player session.

13. The program product of claim 12, further executable for launching a bonus credit redemption sequence based upon an amount of accumulated bonus credits crossing a designated threshold.

14. The program product of claim 9, further executable for triggering a number of player chances in the secondary game after conclusion of the base game round and before beginning a subsequent base game round.

15. A gaming system comprising:

one or more gaming servers each including at least one gaming processor;

one or more gaming machines operatively connected to the gaming servers over a network, each gaming machine including at least a primary display, a set of player operable controls, and at least one gaming processor operatively connected to the primary display, the gaming processors programmed to execute the following steps in coordination with at least one of the gaming servers:

selecting a base game outcome for a base game from a base set of possible base game outcomes, wherein the base game outcome is selected randomly or pseudo-randomly by one of the gaming processors;

selecting a secondary game outcome for a secondary game from a side set of possible secondary game outcomes, the side set of possible secondary game outcomes being distinct from the base set of possible base game outcomes, wherein the secondary game outcome is selected randomly or pseudo-randomly by one of the gaming processors;

displaying a base game round on the primary display of one of the gaming machines, the base game round including an array of symbol locations in a manner simulating a plurality of reels being spun and stopped to produce the base game outcome;

while displaying the base game round, displaying play of a secondary game play on the primary display along with the base game round, the secondary game play including first graphic elements adjacent to graphic elements of the base game, and second graphic elements animated to move through primary display areas showing the graphic elements of the primary game; and awarding any prize associated with the selected base game outcome and awarding any prize associated with the selected secondary game outcome.

16. The system of claim 15, in which the primary game is conducted based upon a designated player currency wager to win credits, and the secondary game is conducted to win bonus credits redeemable only for non-cash prizes.

17. The system of claim 16, in which a number of player chances in the secondary game play are based on a player wager level.

18. The system of claim 16, the gaming processors further programmed for launching a bonus credit redemption sequence based upon an amount of accumulated bonus credits crossing a designated threshold.

19. The system of claim 15, the gaming processors further programmed for accumulating the bonus credits over a number of base game rounds in a player session.

20. The system of claim 19, the gaming processors further programmed for triggering a number of player chances in the secondary game after conclusion of the base game round and before beginning a subsequent base game round.

* * * * *